April 5, 1927. 1,623,206
C. POTTER
FLUID TRANSMISSION MECHANISM
Filed June 13, 1923 2 Sheets-Sheet 2

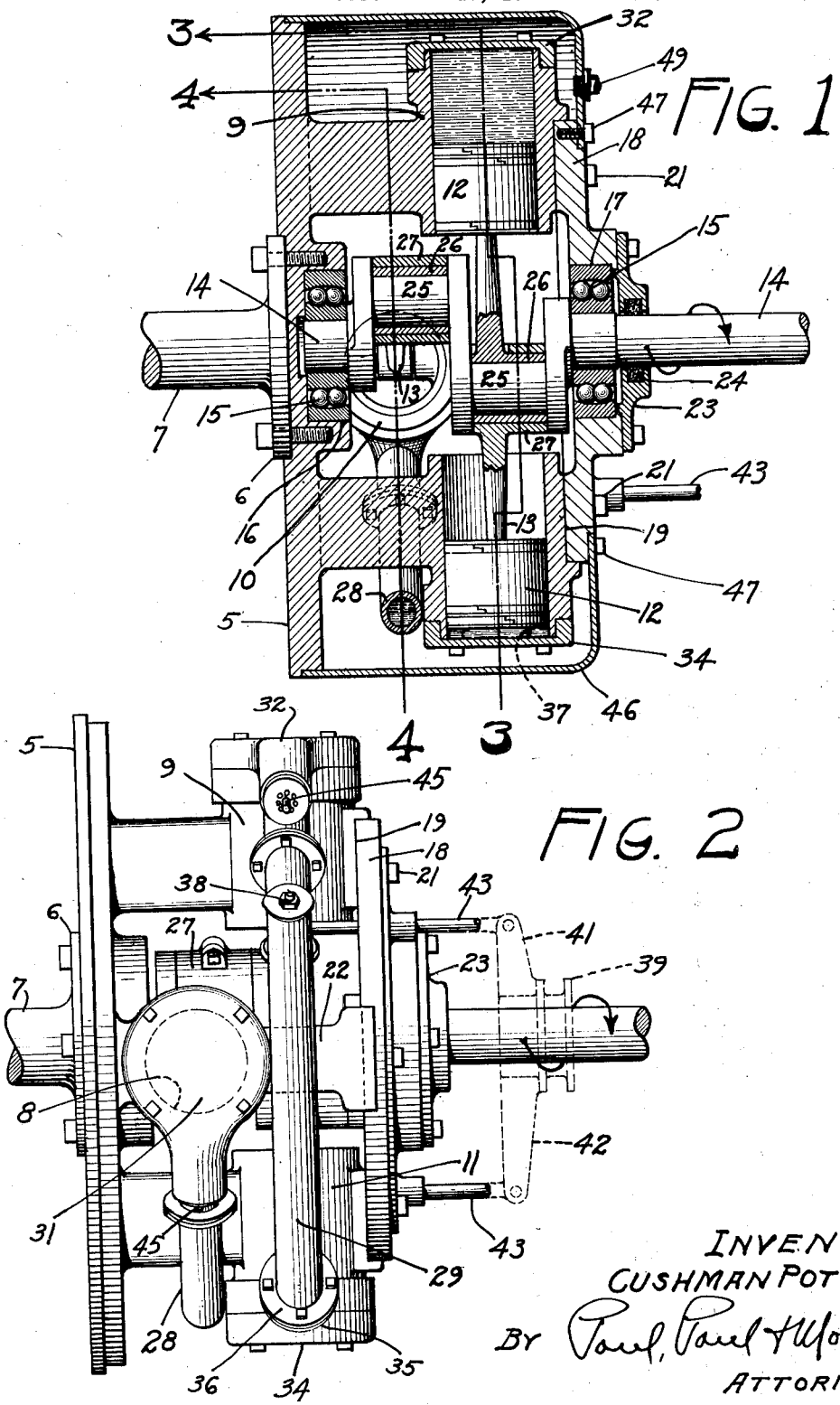

INVENTOR
CUSHMAN POTTER
BY Paul, Paul & Moore
ATTORNEYS

Patented Apr. 5, 1927.

1,623,206

UNITED STATES PATENT OFFICE.

CUSHMAN POTTER, OF HOUSTON, MINNESOTA.

FLUID-TRANSMISSION MECHANISM.

Application filed June 13, 1923. Serial No. 645,109.

This invention relates to improvements in fluid transmissions particularly adapted for use to impart variable speed to a driven element or member from a constantly running shaft or driving member, and more particularly relates to such transmissions adapted for use in connection with motor vehicles to take the place of the usual friction clutch and gear transmission now commonly employed in automobiles to transmit the power from the motor to the drive shaft.

Generally stated, the invention consists of a plurality of cylinders having complementary pistons which are operable in pairs by a crank shaft retained in suitable bearings within a driving member or housing secured to the driven or engine shaft. The cylinders are connected together in pairs by a circulating passage containing a suitable fluid, such as oil.

A throttle or choke valve is interposed in each passage between the connected cylinders by means of which the circulation of the oil may be more or less restricted to vary the relative speed of the driven member or shaft, or, if desired, the circulation of the oil may be entirely cut off, in which case a direct drive will be obtained, the driven shaft rotating at the same speed as the driving member or shaft. Each cylinder is preferably provided with an intake valve by means of which a constant volume of fluid may be maintained in each circulating passage and its connected cylinders to insure proper and efficient functioning of the transmission.

The particular object of the invention, therefore, is to provide an improved fluid transmission of simple and inexpensive construction and which will be highly efficient in its performance.

Other objects will appear from the following description and the accompanying drawings and will be pointed out in the annexed claims.

In the drawing, there has been disclosed a structure designed to carry out the objects of the invention, but it is to be understood that the invention is not confined to the exact features shown, as various changes may be made within the scope of the claims which follow.

In the drawings forming part of this specification,

Figure 1 is a view in vertical section on the line 1—1 of Figure 3, showing a fluid transmission with my invention applied thereto;

Figure 2 is a view showing the transmission with the housing removed;

Figure 3:
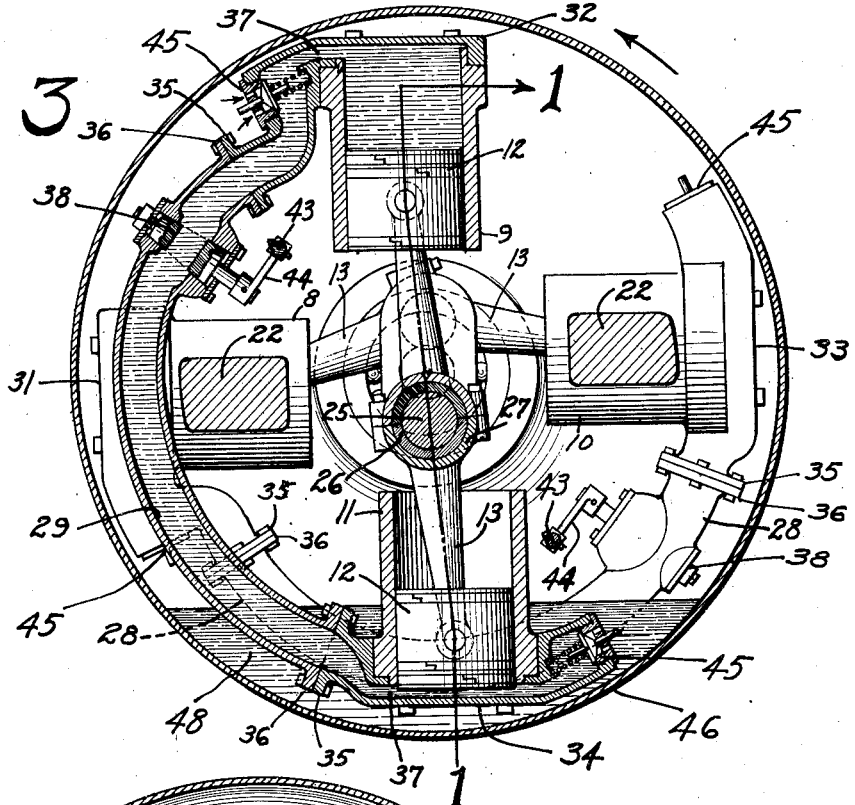
Figure 3 is a cross sectional view on the line 3—3 of Figure 1, showing how the cylinders are connected together in pairs by a circulating passage and also showing one of the throttle valves in open position.
Figure 4:
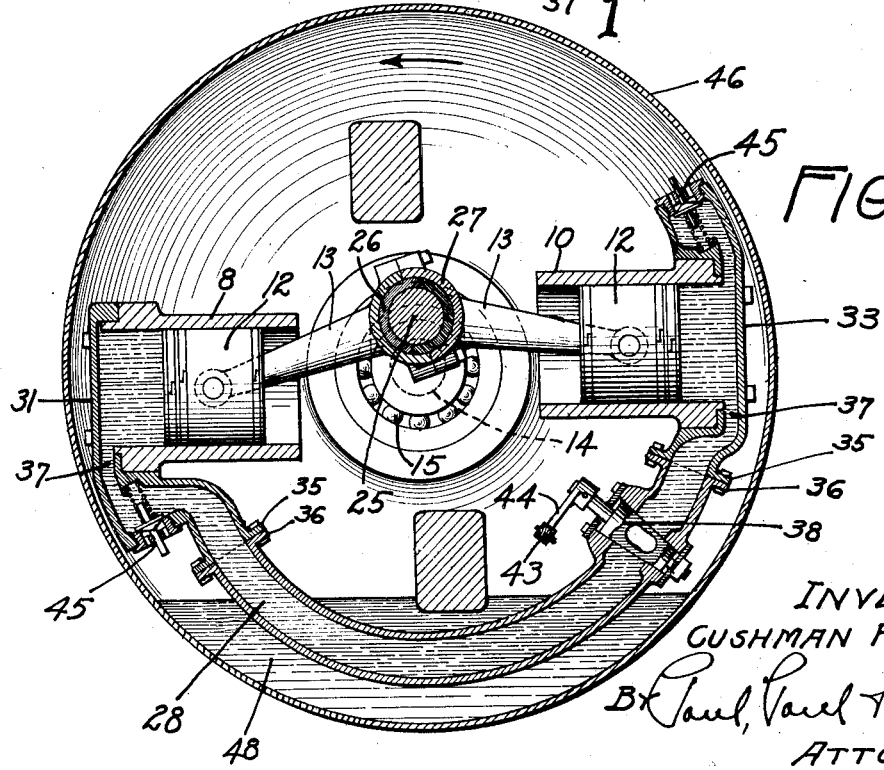
Figure 4 is a similar view on the line 4—4 of Figure 1 showing one of the throttle valves in closed position.

In the selected embodiment of the invention here shown for purposes of disclosure, there is illustrated a fluid transmission comprising a circular disk 5 which is secured to the terminal flange 6 of the motor crank shaft 7 in place of the usual flywheel, as shown in Figures 1 and 2. A series of cylinders 8, 9, 10, and 11 are mounted in fixed spaced relation upon the inner face of the disk 5, adapted to receive for reciprocal movement therein, a like number of complementary pistons 12, as shown in Figures 3 and 4. These pistons, which are of usual construction, are provided with suitable connecting rods 13 by means of which they are connected in pairs to an auxiliary crank shaft 14, as clearly shown in Figure 1. The crank or driven shaft 14 is rotatably mounted in suitable bearings such as ball bearings 15, one of which is retained in a seat 16 provided in the circular disk 5 and the other in a similar seat 17 provided in a face plate 18, which is concentrically mounted in a seat 19 and secured thereto by means of the bolts 21. Referring to Figures 1 and 2, it will be noted that the seat 19 is preferably formed by means of a flattened face provided on the wall of each of the opposed cylinders 9 and 11 and by means of the outwardly extending integral lugs 22 provided upon the walls of the similarly opposed cylinders 8 and 10. A cover plate 23 having a packing ring 24 is secured to the face plate 18 to provide an oil and dust proof joint between the plate and the driven shaft 14.

As shown in Figures 1 and 3, the driven shaft 14 is preferably provided with two cranks 25, each crank being adapted to receive thereon the connecting rods 13 of a pair of opposing cylinders 8—10 and 9—11. One connecting rod of each pair thus mounted is preferably provided with an integral split sleeve 26 adapted to fit one of the cranks 25 and to provide a bearing for the other connecting rod of the pair, which is rotatably mounted thereon by means of the split head or sleeve 27, integrally formed at one end thereof as shown. To provide ample clearance between the connecting rods, each pair of opposed cylinders 8—10 and 9—11 are preferably arranged in staggered relation, as shown in Figures 1 and 2.

In order that relative rotary movement may be transmitted from the driving member or disk 5 to the driven member or shaft 14, to which the drive shaft (not here shown) of the automobile or other machine may be connected, means must be provided to control the relative reciprocal movement of the pistons within their respective cylinders. Such means consists of connecting together in pairs, the opposed cylinders 8—10 and 9—11 by means of suitable circulating passages 28 and 29, respectively, and the removably mounted heads 31, 32, 33 and 34, secured to the outer ends of the cylinders, as shown in Figures 3 and 4. The cylinder heads 31 and 32, secured to the cylinders 8 and 9, are similar in construction, while the heads 33 and 34 of the cylinders 10 and 11 are in like manner similar in construction. Each cylinder head is preferably provided with a coupling flange 35, adapted to cooperate with a similar flange 36, provided at each end of each passage for the purpose of providing a suitable means for securing the passages to the cylinder heads. A communicating passage or port 37 is also provided in each cylinder head through which the fluid may flow from the cylinders to the circulating passages 28 and 29.

Means are provided for restricting and regulating the flow of oil through the circulating passages for the purpose of varying the relative speed of the driven shaft 14, to which the usual drive shaft (not here shown) may be connected. To effect this change of speed a throttle or choke valve 38 is interposed in each passage by means of which the flow of oil through the circulating passages and the ports 37 provided in each cylinder head, may be more or less restricted, and, if desired, may be entirely cut off. These throttle valves are preferably arranged in such a manner as to be simultaneously operated either while the disk 5, carrying the cylinders and passages, is being rotated or when it is stationary, and, as shown by dotted lines in Figure 2, this may be accomplished by means of a sliding flanged sleeve 39 mounted on the shaft 14 adjacent the cover plate 23. This sleeve as shown, is provided with outwardly extending arms 41 and 42 to which the ends of a pair of rods 43 are connected, the other ends of such rods being pivotally connected to the valve arms 44 of the throttle valves 38. The valve operating sleeve 39 may be operated by any suitable means, not shown.

One of the important features of this transmission resides in the novel means provided for supplying and maintaining a constant volume of fluid in each circulating passage and its connected cylinders during the operation of the transmission, which is necessary to insure proper and efficient functioning thereof. To accomplish this feature, a spring controlled intake valve 45 is provided in each cylinder head on the forward side thereof, as clearly shown in Figures 3 and 4. Referring to these two figures, it will also be noted that the cylinders 8—10 and 9—11 of each pair, are preferably arranged in diametrically offset relation. The purpose of thus offsetting the cylinders of each pair is to cause the beginning of the instroke of each piston to be slightly in advance or more rapid than the beginning of the outstroke of the opposed piston, thereby causing a slight vacuum to be built up in the circulating passage and its connected cylinders, causing the intake valves to open with each instroke of their respective pistons until the passages and cylinders have been completely filled with oil. When the passages and cylinders have thus been filled to capacity the intake valves will cease to function, remaining closed as long as the volume of oil in the circulating passages remains constant. However, as soon as the volume therein begins to decrease, which may be caused from leakage around the pistons, etc, the valves will again be opened resulting in a supply of oil being drawn into the passages until they are again filled to capacity. A transmission housing or casing 46, which is preferably secured to the face plate 18 by bolts 47, completely encloses the cylinders and complementary parts thereby also providing a suitable chamber in which a supply of oil may be carried to supply the passages and cylinders and also serving as a means for thoroughly lubricating the transmission. A filler cap 49 is preferably provided in the housing 46 through which oil may be introduced into the transmission.

*Operation.*

To render the transmission operable, a quantity of oil sufficient to fill the two passages and their connected cylinders and to leave a surplus or reserve supply within the housing, is introduced into the transmission housing by removing the filler cap 49. The throttle valves 38 are then turned to full open position, as shown on the left hand side of Figure 3. When the valves have been thus positioned, the motor may be started causing the disk 5, carrying the cylinders, to be rotated about the axis of the driven shaft 14. During such rotation of the cylinders, the pistons will reciprocate freely within their respective cylinders without transmitting any movement to the shaft 14. As the cylinders continue to rotate the intake valves 45 will open at each instroke thereof, until the passages and cylinders have been filled to capacity, as hereinbefore described.

When it is desired to transmit rotary movement to the shaft 14, the throttle valves 38 will be actuated by means of the sleeve 39. As the valves 38 begin to close, the flow of oil through the passages will be restricted causing the reciprocal movement of the pistons within their respective cylinders to be retarded, thereby causing the shaft 14 to be rotated in the direction of the cylinders at a relatively slower speed. Continued closing of the valves 38 will cause the shaft 14 to increase its speed with reference to the motor crank shaft 7, and complete closing of the valves, as shown on the lower right hand side of Figure 4, will cause the shaft 14 to be rotated at the same speed as the motor shaft 7, resulting in a direct drive from the motor to the shaft 14, the entire transmission rotating as a unit.

In various ways the details of construction herein shown may be modified and still be within the scope of my invention.

I claim as my invention:

1. The combination with a drive shaft, of a housing mounted to revolve therewith, cylinders mounted in pairs in said housing in opposing relation, each cylinder of a pair being offset or out of alignment with the other cylinder of the same pair, a shaft having double cranks, pistons for said cylinders connected respectively with said cranks, circulating passages connecting the cylinders of the same pair for conducting the inelastic fluid from one cylinder to the other of the same pair, said passages having intake ports and valves therefor communicating with a fluid supply, the offsetting of said cylinders creating a suction in said passages and opening said valves, and means for interrupting the flow of the inelastic fluid through said passages to check the stroke of said pistons and transmit power to said cranks and shaft.

2. The combination with a drive shaft, of a housing mounted thereon, a driven shaft having double cranks, cylinders mounted in said housing in pairs opposite the cranks of said shaft respectively, pistons arranged in said cylinders, those of the same pair being connected with the opposite crank, inelastic fluid circulating passages connecting the cylinders of the same pair, said cylinders and passages having means for supplying inelastic fluid and automatically returning leakage thereto and means for interrupting or checking the flow of inelastic fluid through said passages from one cylinder to the other.

3. A driving shaft having a housing rotatable therewith, said housing having angularly related pairs of opposed cylinders, and pistons therein, a driven shaft having double cranks, one for each pair of opposed cylinders, connections between each crank and a corresponding pair of pistons, conduits establishing communication between each pair of cylinders, automatic valve controlled intakes for said cylinders and conduits, one disposed in advance of each cylinder in direction of rotation, and a valve in each conduit for controlling the flow of oil therethrough, said valves simultaneously operable from a point externally of the housing.

4. A driving shaft having a housing rotatable therewith as an oil reservoir, said housing having right angularly related pairs of opposed cylinders, and pistons therein, the pairs in different planes, with a prolongation of the axis of each cylinder passing laterally of the shaft axis, a driven shaft having double cranks one for each piston of opposed pairs of cylinders, connections between each crank and the corresponding pairs of pistons, conduits establishing communication between the outer ends of opposed pairs of cylinders, valve-controlled intakes for each cylinder and conduit disposed in advance of the cylinder in direction of rotation of the housing, and means for controlling the rate of flow in each conduit.

5. A driving member having pairs of integral cylinders extending laterally therefrom with their bores opposingly related, each pair right angularly related to the other and in different rotative planes, a piston for each cylinder, a bearing plate removably attached to the cylinders in opposition to and spaced from said driving member, a driven shaft journaled upon the plate and driving member and having cranks one for each pair of cylinders, symmetrical with regards thereto, connections between each crank and corresponding opposed pairs of pistons, prolongations of the axes of the cylinders passing laterally of the rotative axis of the driving member in direction of rotation to obtain piston instroke in advance of outstroke, end caps for the cylinders each having a circumferential base connection with the outer end of the cylinder adjacent the wall of the housing and extending laterally of the cylinder in direction of rotation and each having a passage, communicating with the cylinder, each passage having a terminal inwardly opening check valve on the advance side of the cylinder, a casing forming a reservoir with the driving member and bearing plate, conduits connecting pairs of end caps, and means for controlling the rate of flow in each conduit.

In witness whereof, I have hereunto set my hand this 8th day of June, 1923.

CUSHMAN POTTER.